: US005554774A

United States Patent [19]
Bergmann et al.

[11] Patent Number: 5,554,774
[45] Date of Patent: Sep. 10, 1996

[54] PREPARATION OF CHLORINATED VIOLANTHRONES OR ISOVIOLANTHRONES

[75] Inventors: Udo Bergmann, Bensheim; Gerhard Schäfer, Heidelberg; Heinrich Kowarsch, Oberderdingen, all of Germany

[73] Assignee: BASF Aktiengesellschaft, Ludwigshafen, Germany

[21] Appl. No.: 386,665

[22] Filed: Feb. 10, 1995

[30] Foreign Application Priority Data

Feb. 12, 1994 [DE] Germany ............ 44 04 587.5

[51] Int. Cl.[6] .................................. C07C 50/36
[52] U.S. Cl. ........................................ 552/281
[58] Field of Search ................................ 552/281

[56] References Cited

U.S. PATENT DOCUMENTS 837,775  12/1906  Bally ........................ 552/281
1,842,694  1/1932  Shaw et al. ................ 552/281

FOREIGN PATENT DOCUMENTS 177574  10/1905  Germany .
465988  9/1928  Germany .

*Primary Examiner*—Kimberly J. Prior
*Attorney, Agent, or Firm*—Oblon, Spivak, McClelland, Maier & Neustadt, P.C.

[57] ABSTRACT

Chlorinated violanthrones or isoviolanthrones are prepared by reacting violanthrone or isoviolanthrone with chlorine in the presence of a diluent, using aliphatic carboxylic acids and/or aliphatic halo carboxylic acids as diluent for this purpose.

7 Claims, No Drawings

PREPARATION OF CHLORINATED VIOLANTHRONES OR ISOVIOLANTHRONES

The present invention relates to a novel process for preparing chlorinated violanthrones or isoviolanthrones by reacting violanthrone or isoviolanthrone with chlorine in the presence of a diluent.

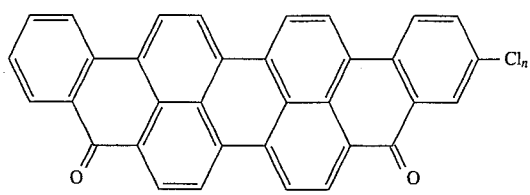

(Ia)

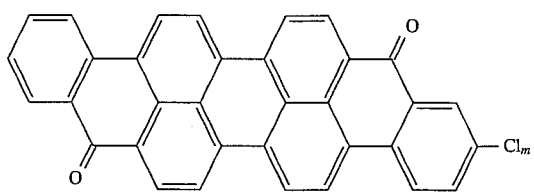

(Ib)

are important vat dyes for the blue to violet range of hues (Ia: C.I. Vat Blue 18 (n=3), C.I. Vat Blue 22 (n=4); Ib: C.I. Vat Violet 1 (m=2)).

In the generally known processes for preparing these vat dyes, the chlorination takes place in nitrobenzene (DE-A-177 574 and 465 988). However, unwanted byproducts are often formed thereby. In addition, the use of nitrobenzene requires, because of its damaging effects on health, special safety measures and complete removal from the products.

Furthermore, chlorination in molten phthalic anhydride is described in U.S. Pat. No. 1,842,694. In this reaction, the recovery of the phthalic anhydride on working up the reaction mixture presents difficulties because phthalate is formed and must be converted back into the anhydride by acidification and ring closure.

Finally, DE-A 177,574 also discloses the bromination of violanthrone in glacial acetic acid, but the reaction conditions are not stated. The chlorination reactions mentioned are, however, always carried out in nitrobenzene.

It is an object of the present invention to provide a process for preparing high-purity chlorinated violanthrones and isoviolanthrones in good yields and purity in a way which is economic and does not pollute the environment.

We have found that this object is achieved by a process for preparing chlorinated violanthrones or isoviolanthrones by reacting violanthrone or isoviolanthrone with chlorine in the presence of a diluent, wherein aliphatic carboxylic acids and/or aliphatic halo carboxylic acids are used as diluent for this purpose.

The number of carbon atoms in the aliphatic carboxylic acids is not in principle important but those acids which are liquid at the reaction temperature are to be preferred.

Hence $C_2$-$C_5$-carboxylic acids, especially $C_2$-$C_3$-carboxylic acids, and very particularly acetic acid, are preferred.

Examples of suitable carboxylic acids are moreover propionic acid, mono-, di- and trichloroacetic acid and mixtures thereof.

As a rule, the non-halogenated acids are to be preferred to the halogenated acids because they are easier to handle, but the halogenated acids, especially the chlorine derivatives, can also be used.

In this connection it has proven beneficial for the acid used, in particular acetic acid, to be virtually anhydrous. A water content of up to 10% by weight does not, as a rule, have an adverse effect, however.

It is particularly advantageous to use anhydrous acids such as glacial acetic acid.

It is surprising that the carboxylic acid which is acting as diluent undergoes negligible chlorination under the reaction conditions and is virtually unchanged after the reaction has taken place (cf. in this connection Ullmanns Encyklopadie der Technischen Chemie, 4th edition, volume 9, page 395 (1975)).

In general, from 4 to 15 kg, preferably 8 to 12 kg, of carboxylic acid are employed per kg of chlorination product.

In some cases, especially for preparing more highly chlorinated products (n or m>3), it is advisable for a halogenation catalyst to be present.

Suitable agents are those customarily used for this purpose, such as iron powder, iron compounds, especially anhydrous iron (III) compounds such as iron (III) chloride, and iodine.

The amount of halogenation catalyst is expediently about 0.5 to 10% of the weight of violanthrone or isoviolanthrone.

The necessary amount of chlorine depends on the required degree of chlorination, ie. on the average number of chlorine atoms to be incorporated in the violanthrone or isoviolanthrone molecule. As a rule, from 1 to 4 mol, preferably 2 to 3 mol, of chlorine ($Cl_2$) are used per chlorine atom to be incorporated, in each case based on 1 mol of violanthrone or isoviolanthrone.

Suitable reaction temperatures are, in general, from 40° to 160° C., especially 40° to 140° C., and very particularly 90° to 120° C.

The reaction can normally be carried out under atmospheric pressure, but it can also be carried out under slightly elevated pressure, as a rule up to about 5 bar.

The chlorination according to the invention can be carried out either continuously or batchwise.

The procedure for the process according to the invention is expediently as follows: the diluent is introduced first in liquid form (room temperature or elevated temperature, eg. about 60° C. for chloroacetic acid) and, while stirring, violanthrone or isoviolanthrone and, if desired, the halogenation catalyst are added and, after heating to the required temperature, the addition of chlorine is started. In this connection it is advisable to introduce the stream of chlorine under the surface of the reaction mixture.

After the introduction of chlorine is complete, which generally takes from 4 to 18 h, the reaction is normally completed by stirring further at the reaction temperature for up to 3 hours.

The reaction mixture can be worked up to the chlorination products in a conventional way, where appropriate after slight cooling, by filtration, washing with the particular diluent and hot water and subsequently drying.

The process according to the invention can be used to prepare chlorinated violanthrones and isoviolanthrones in high purity and good yield, and even the more highly chlorinated products can be obtained without difficulty. Another advantage is the economy of the process. The diluents, especially acetic acid, can easily be regenerated by distillation, and can thus be returned to the process, but are also readily biodegradable so that costly treatment of the wastewater is unnecessary.

EXAMPLES

A mixture of ×g of violanthrone (Ia) or isoviolanthrone (Ib) (100% calculated), a g of diluent D, b g of water and c g of halogenation catalyst C was heated with stirring to T°

C. (in the case of Example 8, the diluent was heated to 60° C. before introducing the other components).

Then, y g of chlorine were passed into the mixture over the course of $t_1$ h.

After subsequently stirring for $t_2$ h at T° C. and cooling to about 70° C., the product was removed by filtration, washed first with glacial acetic acid and then with hot water, and subsequently dried.

Further details of these experiments and their results are compiled in the following Table.

introducing chlorine into the heated reaction medium thereby selectively chlorinating the violanthrone or isoviolanthrone starting material.

2. A process as claimed in claim 1, wherein the reaction is carried out in the presence of a halogenation catalyst.

3. A process as claimed in claim 1, wherein the reaction is carried out in the presence of iron powder, iron(III) chloride or iodine as halogenation catalyst.

TABLE

| Ex. | x g | (Ia) or (Ib) | a g | D | b g water | c g | C | T [°C.] | $t_1$[h] | y g chlorine | $t_2$[h] | Yield [g] | Product (% by wt. Cl found/calc.) |
|---|---|---|---|---|---|---|---|---|---|---|---|---|---|
| 1 | 150 | Ib | 2000 | Glacial acetic acid | — | 10 | Iodine | 110 | 8 | 110 | — | 193 | Dichloroisoviolanthrone (14.0/13.5) |
| 2 | 160 | Ia | 1800 | Glacial acetic acid | 200 | 10 | Iodine | 107 | 18 | 284 | — | 193 | Trichloroviolanthrone (20.5/19.0) |
| 3 | 160 | Ia | 1900 | Glacial acetic acid | 100 | 10 | Iodine | 110 | 23 | 360 | 24 | 221 | Tetrachloroviolanthrone (25.5/23.9) |
| 4 | 43 | Ia | 300 | Glacial acetic acid | — | 0.5 | $FeCl_3$ | 110 | 6 | 76 | 12 | 54 | Trichloroviolanthrone (18.8/19.0) |
| 5 | 43 | Ia | 300 | Propionic acid | — | — | — | 130 | 7 | 94 | 12 | 47 | Trichloroviolanthrone (16.2/19.0) |
| 6* | 43 | Ia | 300 | Glacial acetic acid | — | — | — | 60 | 4 | 65 | 6 | 63 | Tetrachloroviolanthrone (22.3/23.9) |
| 7 | 160 | Ia | 2000 | Glacial acetic acid | — | 10 | Iodine | 110 | 15 | 350 | 12 | 255 | Pentachloroviolanthrone (28.8/28.2) |
| 8 | 24 | Ia | 300 | Chloroacetic acid | — | 1.5 | Iodine | 110 | 5 | 65 | — | 27 | Tetrachloroviolanthrone (23.9/23.9) |
| 9 | 150 | Ib | 2000 | Glacial acetic acid | — | 10 | Iodine | 110 | 15 | 217 | 10 | 205 | Trichloroisoviolanthrone(18.0/19.0) |

*Finely ground violanthrone and chlorine were introduced simultaneously into the glacial acetic acid.

We claim:

1. A process for preparing chlorinated violanthrones or isoviolanthrones, comprising:
   preparing a liquid reaction medium of a violanthrone or a isoviolanthrone in a diluent of a $C_2$–$C_5$ aliphatic monocarboxylic acid, a $C_2$–$C_5$ aliphatic halomonocarboxylic acid, or combination thereof;
   heating the reaction medium to the required temperature for chlorination which is within the range of 40°–160° C.; and 4. A process as claimed in claim 1, wherein the reaction is carried out at from 60° to 160° C.

5. The process of claim 4, wherein the reaction is carried out at a temperature from 90° to 120° C.

6. The process of claim 1, wherein said diluent is acetic acid.

7. The process of claim 1, wherein said diluent is acetic acid having a water content ≦10% by wt.

* * * * *